W. H. BARKER.
LIFE BELT.
APPLICATION FILED APR. 17, 1918.

1,367,225.

Patented Feb. 1, 1921.
3 SHEETS—SHEET 1.

INVENTOR
William Henry Barker

W. H. BARKER.
LIFE BELT.
APPLICATION FILED APR. 17, 1918.
1,367,225.
Patented Feb. 1, 1921.
3 SHEETS—SHEET 2.
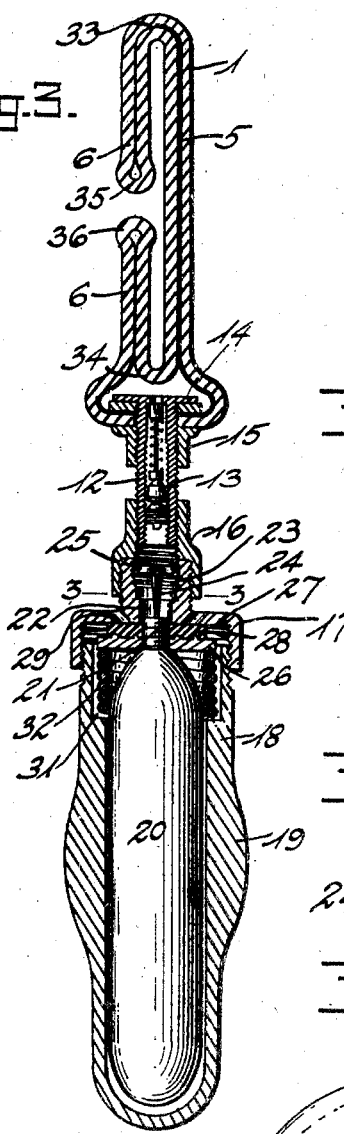
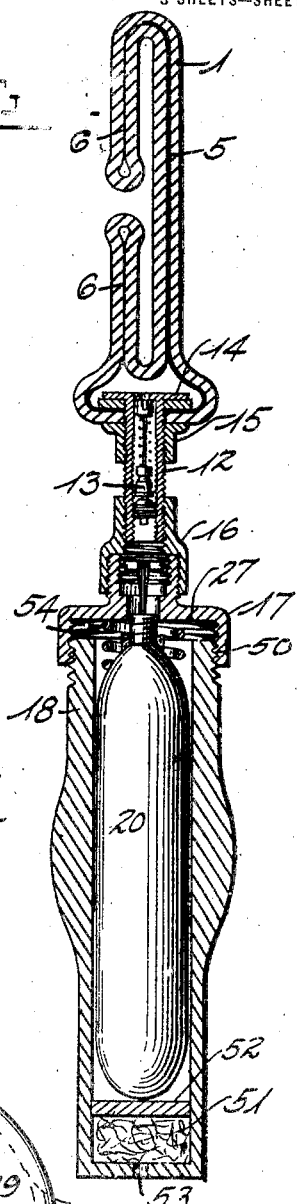
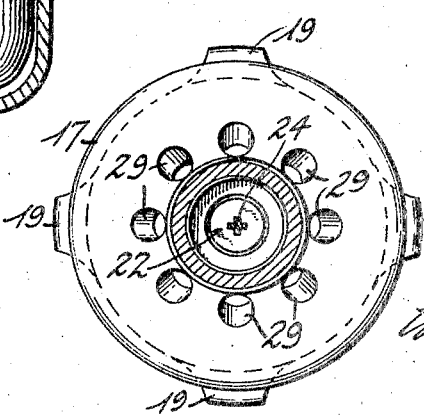
INVENTOR

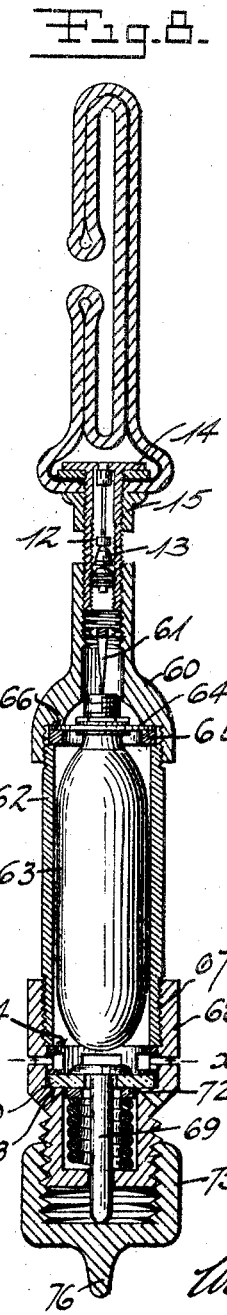

UNITED STATES PATENT OFFICE.

WILLIAM HENDRY BARKER, OF NEW BRIGHTON, NEW YORK, ASSIGNOR TO CUTHBERT W. WRIGHT, OF NEW YORK, N. Y.

LIFE-BELT.

1,367,225.   Specification of Letters Patent.   Patented Feb. 1, 1921.

Application filed April 17, 1918. Serial No. 228,993.

*To all whom it may concern:*

Be it known that I, WILLIAM HENDRY BARKER, a citizen of the United States, and a resident of New Brighton, in the county of Richmond and State of New York, have invented certain new and useful Improvements in Life-Belts, of which the following is a full, clear, and exact description, whereby any one skilled in the art may make and use the same.

The invention relates to life belts, or life buoys, or, in fact, to any device designed to act as a buoyant body to support animate or inanimate weights in water.

It relates more particularly to the manner and method of charging or inflating a collapsible body so that its buoyancy will be materially increased and made available for the support of heavy bodies.

The objects of the invention are to provide a manually operated mechanism combined with an automatically actuated device for insuring proper operation of the inflator, either by the hand of the operator or by immersion in water.

The further objects of the invention are hereinafter defined and set forth in the claims as they relate to the arrangement, function, and operation of the several parts of the mechanism which are correlated to effect the desired results.

Referring to the drawings:

Figure 1 is an illustrative view of a life belt and attached inflater.

Fig. 2 indicates the belt as inflated.

Fig. 3 is a central sectional view through the inflating apparatus and inflation tube.

Fig. 4 is a cross-sectional view on the line 3—3 of Fig. 3.

Fig. 5 is a detail view of the crushing washer.

Fig. 6 is a detail view of the perforating pin.

Fig. 7 is a view similar to that of Fig. 3, illustrating a modified arrangement of the mechanism.

Fig. 8 is a view similar to that of Fig. 3 of a modified form of device.

Fig. 9 is a cross-sectional view on the line $x$—$x$ of Fig. 8.

Fig. 10 is a vertical section of the part shown in Fig. 9.

Fig. 11 is a section on the line $y$—$y$ of Fig. 10.

Fig. 12 is a detail view of the retaining bushing.

Figure 1:
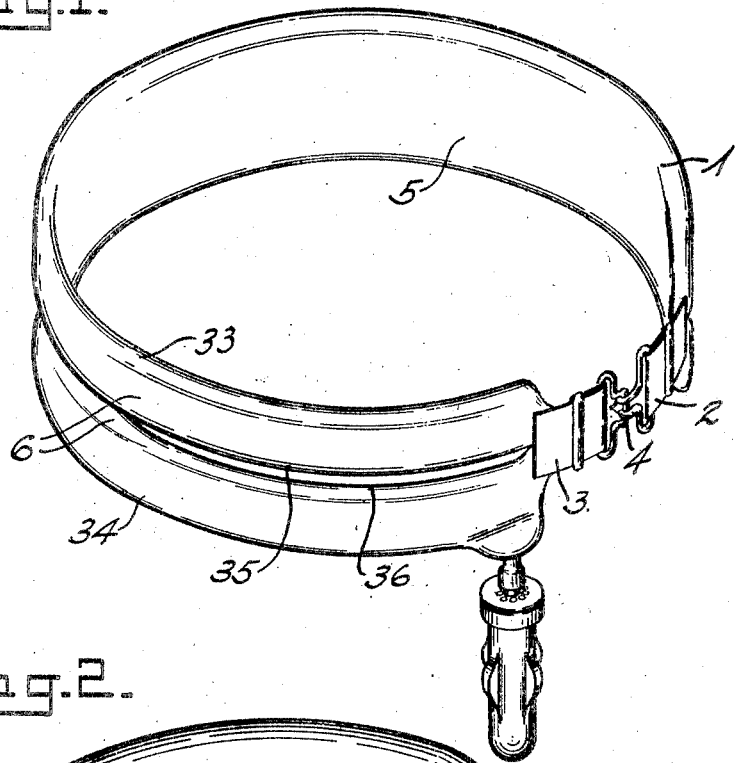

Pneumatic or gas-filled buoys and life belts are not particularly new in the art, nor is a life belt or inflatable buoy of collapsible form adapted to be charged or filled with air or gas from a container a new device.

So far as known to applicant, devices of this character have lacked certain features of advantage and necessity to prove most efficient under varying conditions of use.

It is one of the principal objects of the present invention to provide a life belt of the collapsible type, so constructed that when inflated it will be well balanced as to its buoyancy and its ability to support the body and yet collapse into a compact form so that it may be conveniently worn or stored.

It is also an object to provide a mechanism for inflating the belt which will operate automatically in the event of not being actuated by the operator as soon as it comes in contact with water.

It is quite obvious that life belts are used only under extreme stress of circumstances and conditions wherein the user, under extreme excitement, might very well neglect to remember the full directions for operating the device to insure his safety. Although he might make an attempt to inflate the belt, the chances are that he might neglect to put it in complete operable form.

The present invention, as is hereinafter defined, contemplates, in addition to a means for manually actuating the inflation apparatus, an arrangement which will upon immersion properly inflate the belt whether or no the manually actuated mechanism has been partially or fully operated.

Provision is further made for securing a maximum size for the buoyant body or inflation tube within a minimum of space. Provision has also been made for obviating the pinching or squeezing of the body when the inflation takes place.

In the accompanying drawings, the numeral 1, denotes a belt provided with adjustable securing straps or webs 2, 3, and a quickly detachable fastening 4. This belt has a substantially firm and stiff interior 5, which may be drawn snugly about the body.

Coöperating with the webbing 5, there is a folded flexible casing 6, which provides an inflation chamber to give the required buoyancy.

In practice, the inner webbing or lining 5, has the collapsible casing 6, secured to it and the latter may be formed of any waterproof material such as treated fabric, rubberized cloth, or rubber. In any event and particularly where the casing is made of rubber or of the composite structure, certain points as at 7, 8, are more strongly vulcanized than throughout the remainder of the structure. It follows that upon inflation there will be bulbous extensions 9, 10, at either side of the central front portion of the belt and a bulbous extension 11, extending to the rear. The relative buoyancy of the several sections will thus give a balance which will maintain the body of the wearer in an upright position, permitting freedom of movement under the arms and allowing the body to turn from side to side.

In life belts, ordinarily, where the strap fastenings occupy considerable space at the front, there is a greater buoyancy at the back of the belt than at the sides and front, giving a natural tendency to turn the user upon his face. In the event of temporary collapse of the wearer, fatal results are not infrequent. Furthermore, there is no opportunity for the wearer to rest by moving from side to side in floating position.

In belts which are expanded at the rear and with little or no buoyant surface at the front, the wearer must use great care and be under continual strain to hold the head above water.

These objections are overcome by providing a belt which will "go and come" in use by having more flexible portions at the front and rear than at the sides, or by having the structure of the flexible part of the belt divided into comparatively hard and soft sections. Obviously, as the user changes position in the water, the air will move from one section to another, thus providing a more even balance to support the body without materially decreasing the total buoyancy of the structure for a given size.

Properly secured to the inflation chamber or belt, as illustrated in Figs. 3 and 7, there is a threaded nipple 12, which is provided with a back-pressure valve 13, which holds whatever air or gas is injected into the belt. This nipple is illustrated as having an inner flange or clamping part 14, against which is clamped a threaded nipple 15. There is a threaded union 16, to which is secured a connecting head 17.

The head 17, covers and incloses a casing 18, provided with winged extensions 19, so that it may be screwed up into the connecting head 17. The casing 18, is designed to carry a capsule or cylinder 20, of compressed or liquefied gas or air. This capsule has a neck 21, extending into a comparatively close-fitting duct 22, formed through the connecting head 17. Arranged in a chamber 23, of said head, is a puncturing needle 24. This, as illustrated, has a perforated base 25, which is seated within the chamber and projects into position to engage and perforate the sealed end of the capsule 20.

Upon the capsule 20, adjacent to its neck, there is an abutment or washer 26. Between said washer and the inner wall 27, of the connecting head, there is a soluble ring or gasket 28. Perforations 29, extend through the head 17, so that water may reach the soluble gasket 28, and the face of the washer 26, is provided with scarifying pins or serrations 30, which will tend to crush the soluble washer 28, when placed under extreme pressure, as would be the case were the casing 18, screwed up into the head 17.

Within the casing 18, there is a shoulder 31, which forms an abutment for a compression spring 32, that bears against the washer 26.

When the parts are assembled, the puncturable sealed end of the capsule 20, is just clear of the puncturing needle 24, and is under the compression of the spring 32. The soluble washer or gasket 28, prevents forward movement of the capsule until water reaches said washer. Thereupon, the spring 32, forces the capsule forward and punctures it. It follows that the charge of gas contained in the capsule is injected into the inflation tube or belt and expands it, giving it its required buoyancy.

Of course, under ordinary circumstances, the seal of the capsule 20, would be broken by screwing up the casing 18. As the casing is screwed up, the points 30, of the washer 26, break down the soluble washer 28, permitting engagement of the pin 24, with the seal.

Should the operator fail to complete the operation of forcing up the casing 18, and jump into the water, the soluble washer 28, would immediately permit the spring 32, to complete the operation of puncturing the capsule 1.

From the above, it is apparent that the device will finally operate as indicated and the belt will be properly inflated.

In order to provide for the necessary size of chamber to give the greatest buoyancy for a given-size belt, the flexible portion of the structure is made substantially twice the width of the belt as folded and worn. When made, it is vulcanized into the form illustrated, with overturned edges 33, 34, and outer edges 35, 36, which are folded down to the medial circumferential line of the belt. In this form, the belt may be snugged about the body and will remain in folded position until the charge of inflating gas is projected into the belt. It will obviously open with great ease and produce a chamber of large area, there being substantially double the contents as compared with a single fold.

Figure 2:
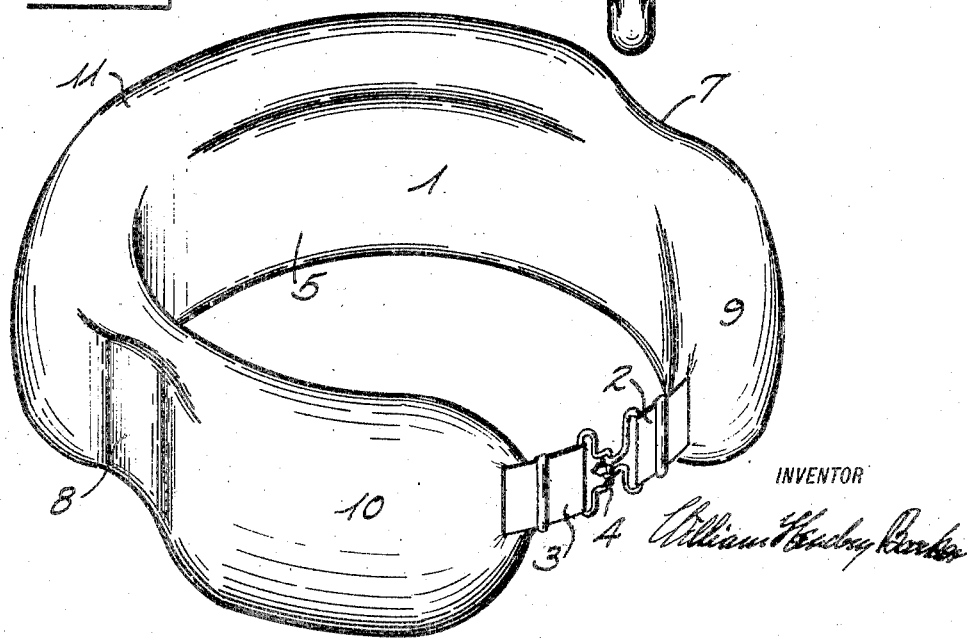

In Fig. 7 of the drawings, there is illustrated a modified form of automatic actuator. In this case, the several parts are the same as described in connection with Figs. 1 to 5 but, in lieu of having a soluble washer to release the capsule 20, an expansible or explosive charge is employed behind the capsule. This obviates the necessity of relying upon the comparatively slow process of dissolution of the soluble washer 28, and gives an almost instantaneous operation.

Referring to Fig. 7, the head 17, has the casing 18, arranged identically as heretofore described. By turning up said casing on a quick-pitched thread 50, the capsule 20, will be forced forward against the pin 24, thus being punctured to charge the inflation belt with gas. The casing 18, is extended somewhat, as compared with that of Fig. 3, to provide an explosion chamber 51. The capsule is backed up by a wad 52, and the rear of the chamber 51, has a comparatively small perforation 53, through which water may enter said chamber. The chamber 51, is packed with a material which is not claimed in the present application but is of a character which will expand with considerable violence, almost approaching an explosion, upon being brought into contact with water, although it is not affected by ordinary moisture of the air. A compound containing metallic sodium or similar quick oxidizing reagent may be employed. The compound is pressed or otherwise formed into the desired shape and preferably coated with a thin layer of kelp gelatin which prevents oxidization under ordinary circumstances but is quickly dissolved upon immersion, thereby bringing the compound into contact with the water.

Obviously, as the belt is immersed, a sufficient quantity of water percolates through the comparatively small perforation 53, to fire the charge in the chamber 51. This will drive the capsule forward until it is punctured. To prevent accidental disarrangement of the capsule, a comparatively light spring 54, is employed between the capsule and the inner wall 27, of the head 17.

It will be obvious that the head 17, and contained parts may be readily disconnected from the nipple 12, until such time as it is desired to prepare the belt for use.

The belt may, in the meantime, be adjusted and worn and, if desired, the connecting head and appurtenant parts may be secured in place on the nipple 12, so that the capsule 20, may be exploded and the belt inflated at a moment's notice.

It is apparent that the device is capable of re-charging when once used by replacing the discharged capsule 20.

In Fig. 8, there is shown a structure which has certain advantages as to its detail as compared with the showing of Figs. 3 and 7.

In said figure, 60, denotes the head piece of the casing which contains the perforating pin 61, and which has screwed to it a tubular casing 62. The capsule 63 has secured to its neck a packing 64, which is of resilient form to permit movement of the capsule 63, so that its seal may be projected against the perforating needle 61. The packing 64, is held in place by a ring 65, which, in turn, is held down by the end of the casing 62, forcing the packing against a shoulder 66. The outer end of the tubular casing 62, is threaded as at 67, and is engaged by a removable head 68. This head has projecting through it a plunger 69, which is normally held in retracted position by a soluble plate 70, the plunger having a suitable head, and washer 72, at opposite sides of the plate 70. The plate 70, rests against a shoulder 73, formed in the head 68, and is held in place by a ferrule 74, suitably secured in the head 68.

Openings are formed through the walls of the head 68, so that the chamber of the tubular casing 62, at one side of the plate 70, and the spring chamber at the opposite side thereof are open for the admission of fluid.

The outer end of the head 68, is threaded and is engaged by a screw-cap 75, having a projecting wing 76, by which it may be screwed up to engage and force forward the plunger 69.

With the parts assembled as shown, a screwing down of the cap 75, will engage and force forward the plunger 69, until it impinges upon the capsule 63, forcing it forward until the puncturing needle perforates its seal.

In the event of failure to screw down the cap sufficiently to explode the capsule, the spring and its plunger 69, will be released, upon immersion of the device, inasmuch as the soluble plate 70, will weaken upon contact with water which passes into the chambers on opposite sides thereof. This weakening of the plate will permit the spring to force the plunger forward to engage and explode the capsule with a hammer-blow.

Should the spring which actuates the plunger 69, for any reason be inactive and fail to drive the capsule 63, forward sufficiently to puncture it, the cap 75, may be forced down into positive engagement with the plunger until the capsule has been punctured.

This arrangement obviously permits manual operation of the device. Failure to properly operate the mechanism manually will be taken care of by the automatic mechanism upon immersion and should this fail upon immersion, a further turning of the manually operated mechanism will insure puncturing of the capsule.

This latter form of device has certain advantages over those heretofore described, inasmuch as it provides for a positive operation even in the event of the failure of the automatic mechanism.

It is also apparent that the parts are easily accessible and that there can be no gas leakage back through the holder of the capsule 63, inasmuch as the packing 64, forms a tight seal. This will insure the projection of the entire contents of the capsule into the life belt or buoy.

Obviously, minor changes might be made in the conformation and arrangement of the several elements to suit the exigencies of any particular case, the main purpose and object being to provide a detachable structure with insurance for the discharge of the capsule, either manually or by contact with water. No specific claim is made for the composition of the soluble washer hereinabove referred to or to the compound utilized in lieu of the washer for producing the necessary expansive forces to discharge the capsule, these to form the subject of a separate application.

What I claim as my invention and desire to secure by Letters Patent is:

1. In combination with an inflatable member, a detachably inflating device comprising a holder, a removable gas capsule arranged therein, a stationary puncturing needle, manually controlled means for forcing the capsule against the puncturing needle, and automatic means for forcing the capsule and needle together upon immersion.

2. In combination with an inflatable member, a detachable inflating device comprising a holder, a removable gas capsule arranged therein, a stationary puncturing needle, manually controlled means for forcing said capsule against the puncturing needle, and automatic means acting to move said capsule against said needle upon immersion of the device.

3. In combination with an inflatable member, a detachable inflating device comprising a casing, a head for said casing, means for connecting said head to the inflatable member, a fixed puncturing needle borne in said head, a gas capsule arranged in and inclosed by the casing and movable therein toward the puncturing needle, manually controlled means for engaging and moving said capsule against the puncturing needle, and automatic means acting to move said capsule against the needle upon immersion.

4. In combination with an inflatable member, a detachable inflating device comprising a casing, a gas capsule therein, a head for said casing, means for securing said head to the inflatable member, a puncturing needle arranged in said head, normally inactive means for forcibly moving the capsule against the needle, means soluble upon immersion for releasing said normally inactive means, and manual means operable before or after the dissolution of the soluble element for forcing the capsule against the puncturing needle.

5. In combination with an inflatable member, a detachable inflating device comprising a holder, a nipple extending from the inflatable member, a check valve in said nipple, a head for said holder and means for securing the head to the nipple, a fixed puncturing needle secured in said head, a movable gas capsule arranged in the holder, means for sealing the connection between the head and capsule, normally inactive means for projecting said capsule against the needle, a soluble locking member for holding said means inactive until immersed, and manual means for moving said capsule before or subsequent to immersion.

6. An inflatable life belt having a stiffening liner and an inflatable portion folded from both edges toward the medial line of the belt and an inflation device connected with said belt, said inflation device having a capsule of compressed gas, and a puncturing device for releasing said gas, means for manually operating the puncturing devices, and automatic means for actuating the puncturing devices upon immersion.

7. In combination with an inflatable member of belt-form having an inflation tube the walls of which are folded from opposite sides of the belt to the medial center thereof, adjustable fastening devices for said belt and a manually and automatically actuated inflater operatively secured to the belt for inflating the same before or after immersion.

8. In combination with an inflatable member, a detachable inflating device comprising a head, a puncturing needle secured in said head, a gas capsule projecting into the head, a flexible seal intermediate the capsule and head, a removable head at the opposite end of said casing, a plunger arranged in said head, a spring normally compressed for moving said plunger and the capsule, a soluble washer interposed between the spring and plunger, perforations for admitting liquid to both sides of said soluble washer, and means for manually moving said plunger independently of its automatic movement by the spring.

WILLIAM HENDRY BARKER.

Witnesses:
ABRAHAM LIPTON,
EDITH REMOND.